(12) United States Patent
Connot

(10) Patent No.: US 12,139,925 B2
(45) Date of Patent: Nov. 12, 2024

(54) PORTABLE SHADE DEVICE

(71) Applicant: Kevin Connot, Allen, NE (US)

(72) Inventor: Kevin Connot, Allen, NE (US)

( * ) Notice: Subject to any disclaimer, the term of this patent is extended or adjusted under 35 U.S.C. 154(b) by 158 days.

(21) Appl. No.: 17/891,243

(22) Filed: Aug. 19, 2022

(65) Prior Publication Data

US 2023/0068135 A1 Mar. 2, 2023

Related U.S. Application Data

(60) Provisional application No. 63/238,453, filed on Aug. 30, 2021.

(51) Int. Cl.
*E04H 15/48* (2006.01)
*A01K 1/00* (2006.01)
*E04H 15/06* (2006.01)

(52) U.S. Cl.
CPC .......... *E04H 15/48* (2013.01); *A01K 1/0035* (2013.01); *E04H 15/06* (2013.01)

(58) Field of Classification Search
CPC .... A45B 2023/0006; A45B 2023/0093; E04H 15/06; E04H 15/48; A01K 1/0035
USPC ............................... 135/912, 88.01
See application file for complete search history.

(56) References Cited

U.S. PATENT DOCUMENTS

| | | | | |
|---|---|---|---|---|
| 223,468 A * | 1/1880 | Benthall | ................ | E04H 15/44 135/900 |
| 1,128,558 A * | 2/1915 | Voorhies | ................ | A45B 23/00 135/900 |
| 1,661,667 A * | 3/1928 | Mallach | ................ | A47F 7/24 135/912 |
| 2,002,296 A * | 5/1935 | Pope | ................ | A45B 17/00 135/912 |
| 4,000,750 A * | 1/1977 | Becher | ................ | E04H 15/28 135/20.3 |
| 5,575,301 A * | 11/1996 | Bolton | ................ | E04H 15/58 135/912 |
| 5,967,162 A * | 10/1999 | Bolton | ................ | E04H 15/58 239/722 |
| 6,418,953 B1 * | 7/2002 | Novotny | ................ | E04H 15/58 135/912 |
| 6,996,941 B1 * | 2/2006 | Maschoff | ................ | E04H 15/48 135/912 |
| 7,044,145 B2 * | 5/2006 | Bouchard | ................ | E04H 15/06 135/912 |
| 9,426,969 B1 * | 8/2016 | Hundt | ................ | A01K 13/006 |

* cited by examiner

*Primary Examiner* — Noah Chandler Hawk
(74) *Attorney, Agent, or Firm* — ZarleyConley PLC

(57) ABSTRACT

A portable shade device having an elongated member and transverse members at each end. Wheels are mounted to each end of the transverse members. A pair of vertical support masts are connected to the frame and a horizontal brace extends between the pair of vertical support masts. Operatively attached to each of the pair of vertical support masts is a deployment system. The deployment system includes a nut attached to the vertical support mast adjacent the frame and a threaded rod extends through the nut and has a socket adapted to receive an impact driver at one end and a head at the opposite end.

9 Claims, 3 Drawing Sheets

PORTABLE SHADE DEVICE

CROSS REFERENCE TO RELATED APPLICATION

This application claims the benefit of U.S. Provisional Application Ser. No. 63/238,453 filed Aug. 30, 2021, the content of which is hereby incorporated by reference in its entirety.

BACKGROUND OF THE INVENTION

The present invention is directed to a device for providing shade, and more particularly, a portable device for providing shade for livestock and the like.

When raising livestock, shade can solve a lot of problems. Shade can improve livestock grazing and production. Cattle without shade gain less weight and produce less milk than their cool counterparts. Fertility rates drop also. Shade also impacts livestock movement determining where manure is deposited and how much of a pasture is grazed.

But getting shade to where one wants can be a real problem. If the shade device is light enough to haul, it often is not heavy enough to stay in place when the wind blows. If the device is heavy enough to withstand the weather, it typically is very difficult to move. Therefore, a need exists in the art for a device that addresses these deficiencies.

An objective of the present invention is to provide a portable shade device that is light enough to haul and heavy enough to withstand the wind.

This and other objectives will be apparent to those skilled in the art based upon the following written description, drawings, and claims.

SUMMARY OF THE INVENTION

A portable shade device having a frame with an elongated member, transverse members at each end, and wheels at each end of the transverse members. A pair of vertical support masts are connected to the frame and a horizontal brace extends between the pair of vertical support masts. Operatively connected to the pair of vertical support masts are deployment systems.

The deployment system includes a nut attached to the vertical support mast adjacent the frame, a threaded rod extending through the nut and having a socket adapted to receive an impact driver at one end and a head at the opposite end. The head is connected to an adjustment member that is slidably mounted to the mast, and hingedly connected to the adjustment member are a plurality of angled support members. The angled support members include a first and a second link wherein the first link is connected to the adjustment member at a first end and is hingedly connected to the second link at the second end. The second link is connected to a horizontal support at its outer end.

The horizontal support extends from the outer end of the second link to the top end of the vertical support mast at a top end. The horizontal supports are connected to a canopy. The canopy has a section releasably connected to a spring-loaded hinge.

DETAILED DESCRIPTION

Figure 1:
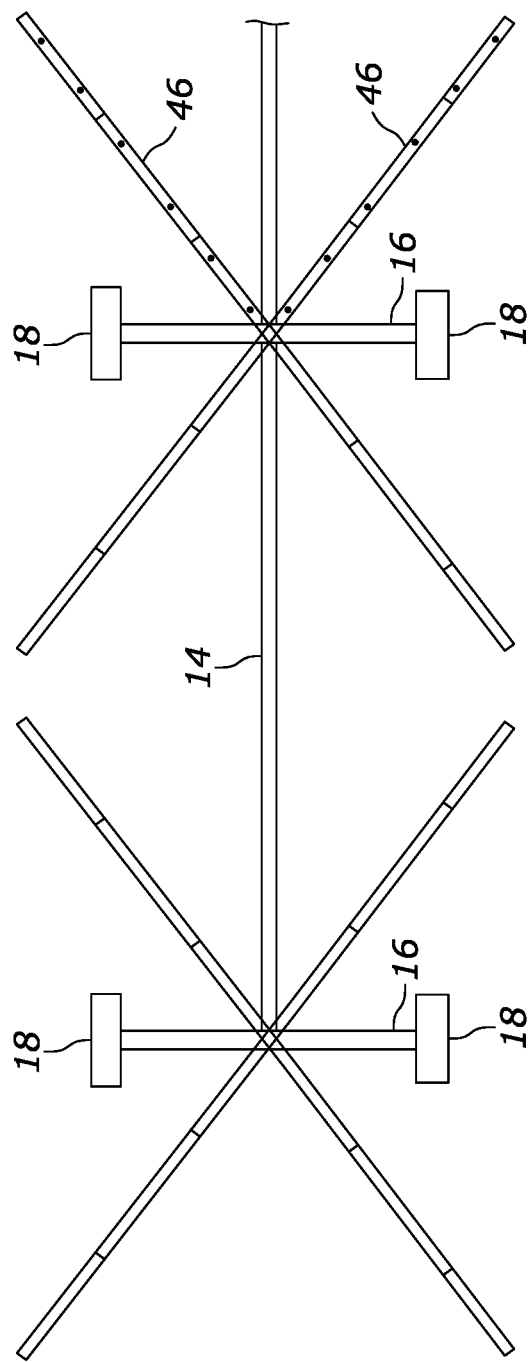
FIG. 1 is a top plan view of a portable shade device.
Figure 3:
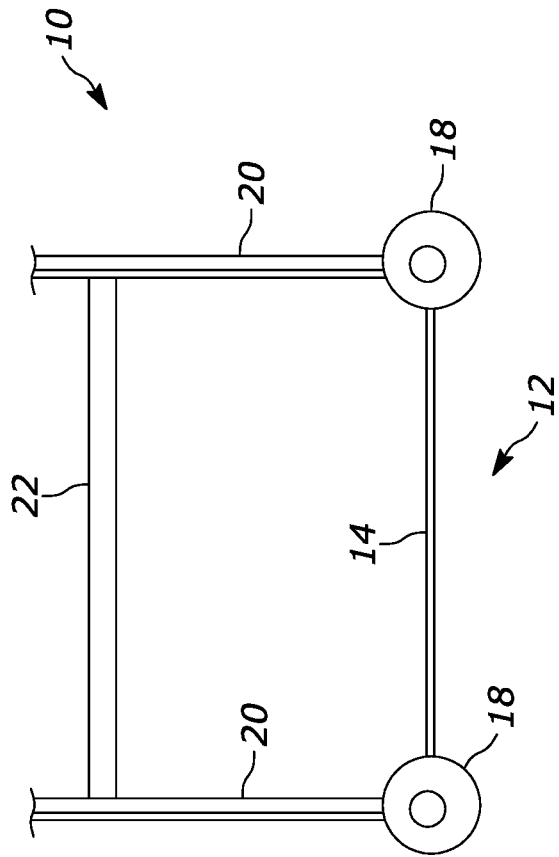
FIG. 3 is a side view of a portable shade device.
Figure 2:
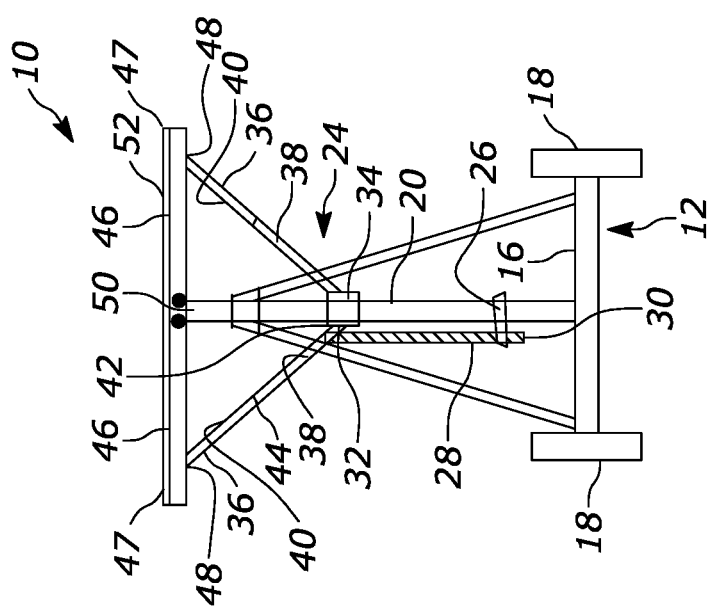
FIG. 2 is an end view of a portable shade device.
Figure 4:
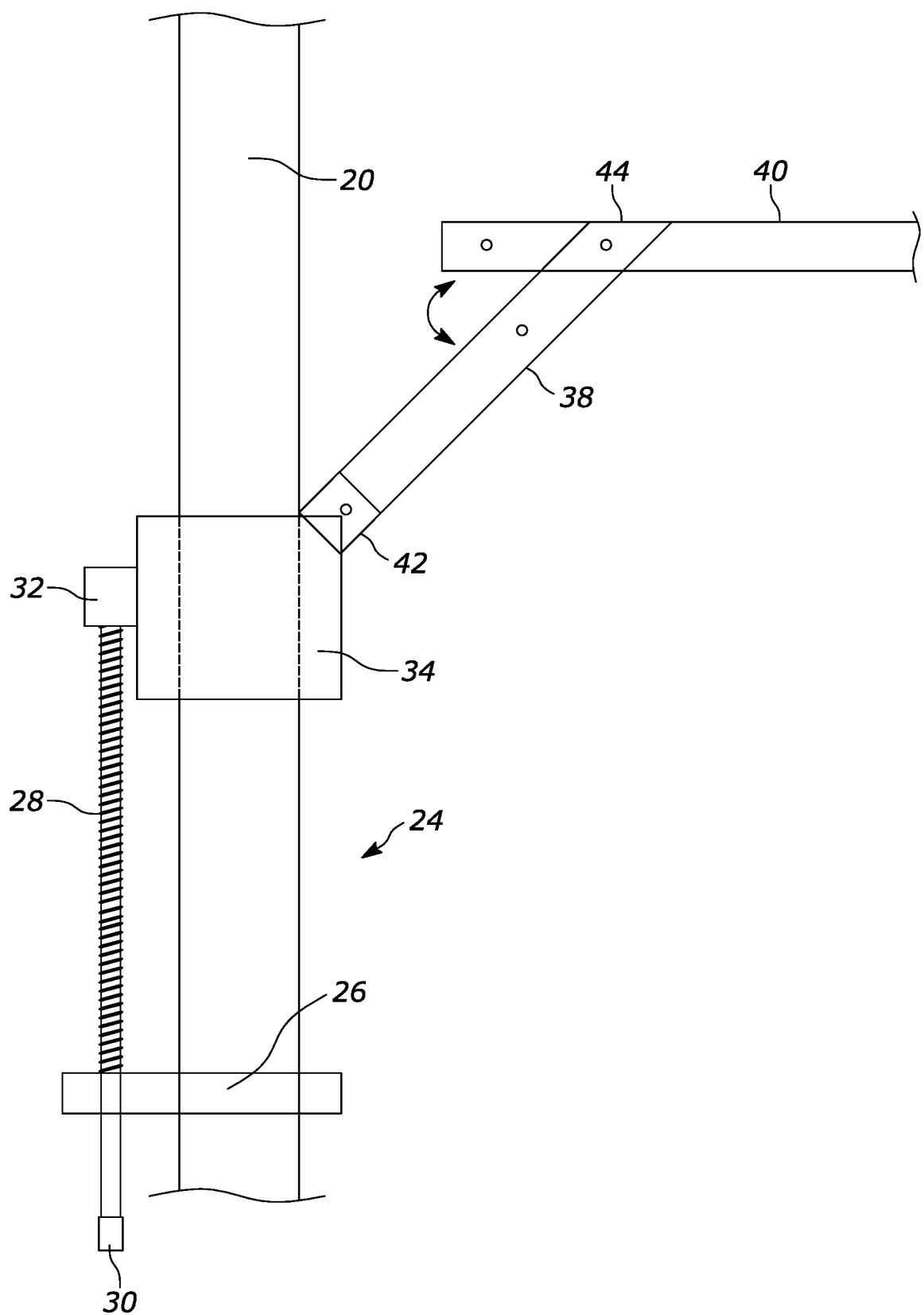
FIG. 4 is a side view of a deployment system for a portable shade device.

Referring to the Figures, a portable shade device 10 includes a frame 12. The frame 12 is of any size, shape and structure. In the example shown the frame 12 has an elongated member 14 with shorter transverse members 16 at each end of the elongated member 14. Wheels 18 are mounted to each end of the transverse members 16. A pair of vertical support masts or tubes 20 are connected to the frame 12 where the elongated member 14 meets the transverse members 16 at each end of the elongated member 14. A horizontal brace 22 extends between the pair of vertical support masts 20.

Operatively attached to each vertical support mast 20 is a deployment system 24. The deployment system 24 is of any size, shape and structure. In the example shown the deployment system 24 includes an Acme nut 26 attached to the mast 20 adjacent the frame 12. Extending through the nut 26 is a threaded rod 28 having a socket 30 adapted to receive an impact driver (not shown) at one end and a head 32 at the opposite end. The head 32 is connected to an adjustment member 34 that is slidably mounted to the mast 20. Hingedly connected to the adjustment member 34 are a plurality of angled support members 36. Preferably, the angled support members 36 include a first 38 and a second link 40. The first link 38 is hingedly connected to the adjustment member at a first end 42 and is hingedly connected to the second link 40 at a second end 44. The second link 40 is connected to a horizontal support 46 at its outer end 47. The horizontal supports 46 extend from the outer end 47 of the second link 40 to the top end 48 of the vertical support mast 20 at a top end 50. Connected to the horizontal supports 46 is a layer of material or canopy 52 adapted to provide shade when the device 10 is in an extended operating position. Each horizontal support 46 has a spring-loaded hinge 54 configured to collapse under wind stress. The canopy 52 has a patch or section 56 releasably connected to the spring-loaded hinge 54.

In operation, in a transport position, the adjustment member 34 is in a lowered position in relation to the vertical support mast 20. In this position the first links 38, second links 40 and horizontal supports 46 are generally in a vertical position. To raise the portable shade device 10 to an operating position an impact driver such as an electric drill is inserted in the socket 30 of the threaded rod 28 and activated. Upon activation, the drill rotates the threaded rod 28 through the fixed nut 26 causing the threaded rod 28 to extend in a vertical direction.

As the rod 28 extends in a vertical direction, so does the adjustment member 34 slide upwardly and vertically in relation to the vertical support mast 20. Due to the connection between the first link 38, the second link 40, and the horizontal support 46, the first link 38 moves away from the vertical support mast from a generally vertical position toward an angled position. This causes the second link 40 to move away from the vertical support mast 20 and from a generally vertical position, past a horizontal position, to an angled position similar if not the same to the angled position of the first link 38. The movement of the second link 40 causes the horizontal support 46 to move from a generally vertical position away from the vertical support mast at the horizontal support's outer end 47 to a generally horizontal position. In the operating position the canopy 52 is extended between the horizontal supports 46, thus providing shade.

Should the canopy 52 encounter stress or force from the wind at a level that would cause structural damage the canopy 52 would pull against the spring-loaded hinge 54 causing the horizontal support 46 to collapse as section 56 is released from the spring loaded hinge 54 to prevent damage.

From the above discussion and accompanying figures and claims it will be appreciated that the portable shade device 10 offers many advantages over the prior art. It will be appreciated further by those skilled in the art that other various modification could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A portable shade device, comprising:
   a frame having an elongated member and transverse members at each end;
   wheels mounted to each end of the transverse members;
   a pair of vertical support masts connected to the frame;
   a horizontal brace extending between the pair of vertical support masts; and
   a deployment system operatively attached to each of the pair of vertical support masts;
   wherein the deployment system includes a nut attached to the vertical support mast adjacent the frame, a threaded rod extending through the nut and having a socket adapted to receive an impact driver at one end and a head at the opposite end.

2. The device of claim 1 wherein the head is connected to an adjustment member that is slidably mounted to the mast and hingedly connected to the adjustment member are a plurality of angled support members.

3. The device of claim 2 wherein the angled support members include a first and a second link.

4. The device of claim 3 wherein the first link is connected to the adjustment member at a first end and is hingedly connected to the second link at the second end.

5. The device of claim 3 wherein the second link is connected to a horizontal support at its outer end.

6. The device of claim 5 wherein the horizontal support extends from the outer end of the second link to the top end of the vertical support mast at a top end.

7. The device of claim 5 wherein the horizontal supports are connected to a canopy.

8. The device of claim 7 wherein the canopy has a section releasably connected to a spring-loaded hinge.

9. The device of claim 5 wherein each horizontal support has a spring-loaded hinge configured to collapse under wind stress.

* * * * *